GEORGE RUSSELL JAMES
ALEXANDER CHEVION
HARRY G. BOCCKINO
INVENTORS.

GEORGE RUSSELL JAMES
ALEXANDER CHEVION
HARRY G. BOCCKINO
INVENTORS 3,334,971
CATALYTICALLY REFORMING HYDROCARBON
AND STEAM MIXTURES
George Russell James, Armonk, and Alexander Chevion, Riverdale, N.Y., and Harry G. Bocckino, Somerville, N.J., assignors to Chemical Construction Corporation, New York, N.Y., a corporation of Delaware
Filed Aug. 18, 1964, Ser. No. 390,432
7 Claims. (Cl. 23—288)

ABSTRACT OF THE DISCLOSURE

Gaseous hydrocarbons are catalytically steam reformed to produce synthesis gas in an apparatus consisting of a reformer furnace having a radiant heat zone or section, in which catalyst-filled reaction tubes are vertically suspended. Each reaction tube is provided with a juxtaposed parallel steam preheat tube in the radiant heating zone of the furnace, and reaction steam flows upwards through the steam preheat tubes and is highly superheated. The steam then flows via an upper connection from each preheat tube to its adjacent reaction tube, and is mixed with gaseous hydrocarbon at the upper end of the reaction tube, employing a vertical central thermally insulated conduit for hydrocarbon inlet and a funnel-shaped baffle disposed in the upper end of the reaction tube and provided with a lower duct extending downwards from its lower throat section for mixing. The upper conduit extends downwards into the baffle from above the reaction tube, and centrally discharges the gaseous hydrocarbon into the throat section of the baffle, while the superheated steam flows annularly downwards past the downwardly converging side walls of the baffle. The process streams then mix at the throat section of the baffle, and the mixture flows downward through the duct and discharges into the catalyst bed in the reaction tube. A reformed synthesis gas mixture is removed from the lower ends of the reaction tubes.

This invention relates to an improved hydrocarbon reformer furnace. An improved furnace apparatus has been developed, in which the combination of apparatus elements achieves improved and greater superheat of the steam passing to the reaction, as well as better overall heat economy and utilization. In addition, improved apparatus is provided for the mixing of the superheated steam with the gaseous hydrocarbon prior to catalytic reaction.

The present invention will be described in relation to the process of hydrocarbon conversion known as primary reforming, which is widely employed to produce synthesis gas and hydrogen. In this well-known process, a gaseous hydrocarbon such as methane is catalytically reacted with steam at elevated temperatures, to produce a reformed gas mixture containing principally hydrogen and carbon monoxide, in accordance with the following reaction:

(1) $CH_4 + H_2O \rightarrow CO + 3H_2$

It will be understood that higher hydrocarbons such as propane and hexane may also be catalytically reacted with steam in a similar manner, to produce a mixed carbon monoxide-hydrogen gas stream. Thus, within the context of the present invention, the term "gaseous hydrocarbon" is meant to include not only normally gaseous hydrocarbons such as methane and propane, but also includes pre-vaporized normally liquid hydrocarbons, such as hexane or petroleum refining low-boiling fractions such as naphtha.

The overall steam reforming reaction is endothermic, and consequently the usual practice is to pass the input mixture of gaseous hydrocarbon and steam through an externally heated reaction tube or group of tubes. The tubes are packed with solid catalyst granules, usually consisting of activated nickel deposited on a suitable carrier. The hot product reformed gas mixture is withdrawn from the primary reformer unit and then passed to further processing. The requisite heating is usually provided by burning a fluid hydrocarbon fuel with air inside the furnace and external to the catalyst-filled reformer tubes. Since the reform reaction must be carried out at a highly elevated temperature, the flue gas generated by burning the hydrocarbon fuel is removed from the furnace at a relatively high temperature. Sensible heat in this flue gas is usually recovered in an auxiliary waste heat boiler.

In the present invention, a unique apparatus assemblage is provided for carrying out the primary steam reforming of gaseous hydrocarbons. The furnace is provided with a plurality of vertical reformer tube assemblies, each of which consists of a catalyst-filled reaction tube and an adjacent parallel steam preheat tube. The reaction tube and preheat tube are connected at their upper ends, so as to form a continuous passage. Steam is passed upwards through the preheat tube and is thus highly superheated due to exposure to radiant heat in the furnace. The superheated steam is then mixed with gaseous hydrocarbon at the top of the reaction tube, and the mixture then flows downward through the reaction tube to yield the reformed gas mixture. In one embodiment of the present invention, a perforated horizontal refractory partition is provided within the furnace below the reformer tube assemblies. The hot flue gas generated within the furnace by burning of fluid hydrocarbons is conducted through the perforations in the partition, and into heat exchange contact with preheat coils disposed below the partition. The perforations in the partition may be varied in size, to provide even distribution of flue gas and uniform overall pressure drops in the furnace. The preheat coils contain reaction steam, and discharge into the vertical preheat tubes mentioned supra through vertical extensions which pass through the partition. In this case, the steam is first superheated in the coils below the partition and is thereafter further superheated in the preheat tubes by exposure to radiant heat. Thus, the sensible heat available in the flue gas generated in the refractory-lined radiant heat section of the furnace is utilized to preheat and superheat the reaction steam. The preheat coils also serve to accommodate for thermal expansion of the reformer tube assemblies, particularly expansion of the preheat tubes.

Another unique aspect of the present invention resides in the provision of a novel apparatus arrangement for mixing of the superheated steam with the gaseous hydrocarbon. A funnel-shaped baffle provided with downwardly converging side walls is disposed in the upper end of the reaction tube. A duct extends downward from the lower throat section of the baffle, and discharges above the catalyst bed. An upper conduit extends downward into the baffle from above the reaction tube, and centrally discharges the gaseous hydrocarbon into the throat section of the baffle, while the superheated steam flows annularly downwards past the downwardly converging side walls. The process streams then mix at the throat section of the baffle, and the mixture flows downward through the duct and discharges into the catalyst bed.

Finally, a solid axal core is preferably provided within each steam preheat tube, and is centrally disposed within the tube so as to divert the steam into an annular passage for improved heat transfer and superheat of the steam.

The apparatus of the present invention provides several important advantages. The provision of reformer tube assemblies with separate steam preheat tubes in the radiant heat section of the furnace results in greater superheat of the steam to a higher temperature, prior to mixing with the gaseous hydrocarbons. Thus, the preheat tubes function as a highly economical internal superheater. The attainment of higher superheat is especially great when the steam preheat tubes are provided with centrally disposed axial solid cores, since greater heat transfer efficiency is thereby attained. The higher superheat has concomitant advantageous process benefits, since higher reforming temperature is thus attained, which leads to more complete conversion of the gaseous hydrocarbon with less catalyst and higher space velocities through the catalyst bed. The provision of steam preheat coils below the perforated partition for heat exchange with the hot flue gas results in improved heat economy in steam preheating due to the additional absorption by the steam of an extra increment of preheat from the hot flue gas. The unique apparatus arrangement for mixing of the gaseous hydrocarbon with the superheated steam is highly advantageous, in that total and uniform mixing is almost instantly attained, without backflow and also while preventing thermal decomposition of the hydrocarbon and carbon deposition.

It is an object of the present invention to provide an improved apparatus for catalytic steam reforming of gaseous hydrocarbons. Another object is to provide an apparatus which attains greater superheat of reaction steam.

A further object is to provide an apparatus which attains improved heat economy due to greater heat recovery from flue gas.

An additional object is to provide an improved apparatus for mixing of gaseous hydrocarbon with superheated steam prior to catalytic reforming.

Still another object is to provide an apparatus which preheats reaction steam in a novel manner with improved heat transfer.

These and other objects and advantages of the present invention will become evident from the description which follows. Referring to the figures, FIGURE 1 is an overall elevation view of the apparatus of the present invention.

Figure 1:
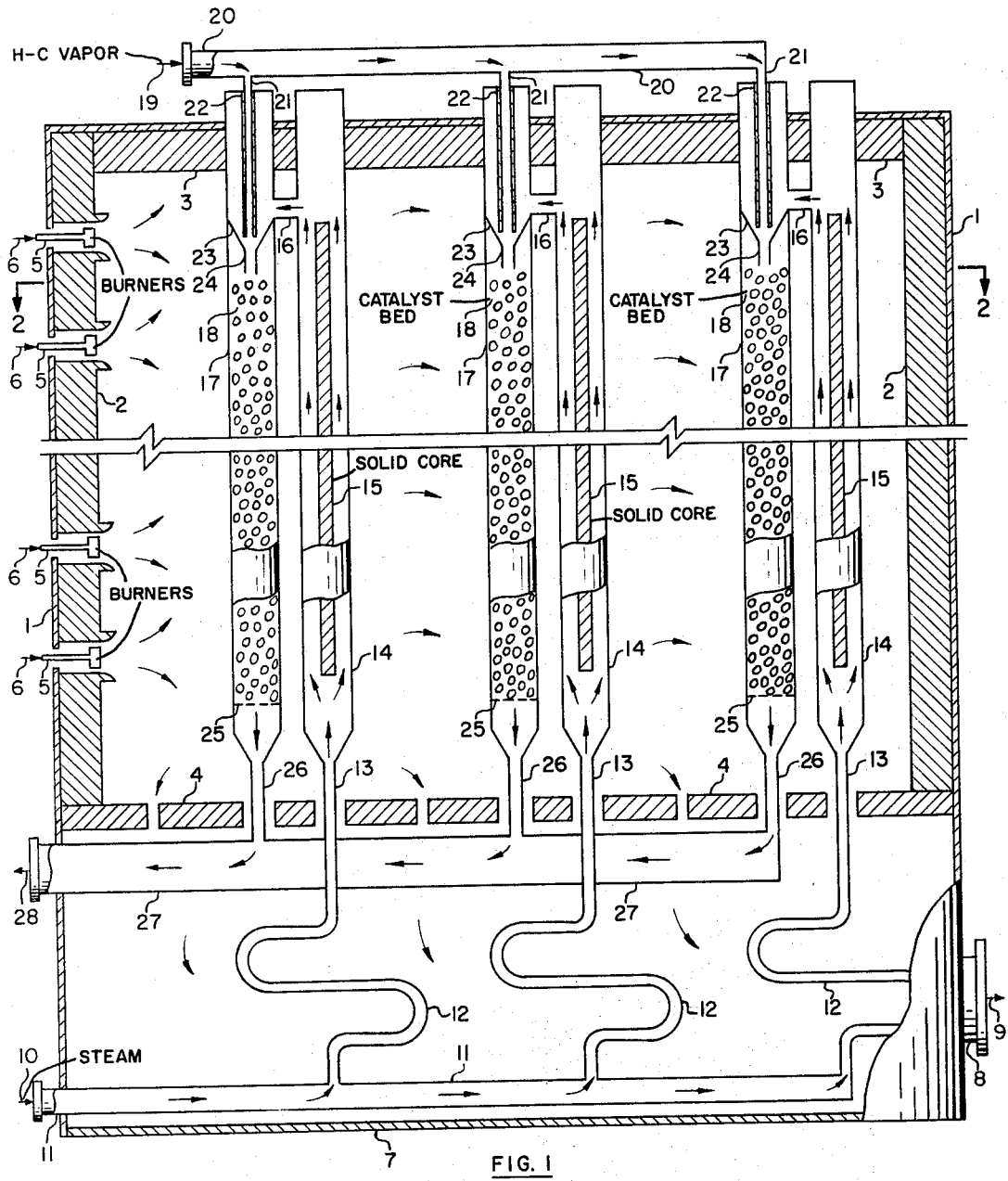

Referring now to FIGURE 1, the apparatus is contained in a vertically extending container 1, which is preferably square or rectangular in horizontal cross-section. The container 1 is provided with a refractory inner wall lining 2, a refractory roof lining 3, and preferably also with a lower refractory partition 4, which is perforated to permit downwards passage of flue gas. Thus, a refractory-lined radiant heating furnace is provided, defined by walls 2, roof 3 and partition 4. Burners 5 are provided to heat the furnace, and are preferably disposed in the wall 2 so as to discharge combustion flame horizontally into the furnace. Alternatively or additionally, burners may be provided in the roof 3. The burners are fed with a fluid hydrocarbon fuel such as methane or fuel oil via streams 6, together with an annular feed of combustion air. Thus, a highly elevated temperature is maintained within the furnace, with radiant heating effects. The hot flue gas flows downward from the radiant heating furnace section and through the perforations in partition 4 to a lower preheat chamber defined by partition 4, container 1 and floor 7. The perforations in partition 4 may be suitably varied in size, not shown, to provide even distribution of flue gas and uniform overall pressure drops in the furnace. The flue gas is cooled in this preheat chamber, and is finally discharged via flanged outlet conduit 8 as stream 9.

Process reaction steam is admitted via stream 10 into flanged distribution conduit 11, which extends into the preheat chamber. Conduit 11 distributes the process steam into preheat coils 12, which are disposed in the preheat chamber so as to absorb heat from the hot flue gas, thus superheating the process steam. The coils 12 discharge the process steam into upwardly extending vertical extensions 13, which pass upward through perforations in partition 4 and discharge the steam into preheat tubes 14. The process steam thus flows upward through the preheat tubes in the radiant heating section of the furnace, and is highly superheated by radiant heating. Tubes 14 are preferably provided with solid axial cores 15, which are centrally disposed in the tubes 14 so as to divert the process steam into an annular passage adjacent to the inner wall of the tubes 14, thus providing improved heat transfer. The tubes 14 are preferably extended upwards through the roof 3 to an external upper tube support, not shown.

The highly superheated steam now passes from the upper end of tubes 14 through horizontal upper connections 16 and into the upper end of the reaction tubes 17, where the superheated steam is mixed with gaseous hydrocarbon. The mixture of steam and gaseous hydrocarbon is the passed downward through catalyst beds 18 within tubes 17 for catalytic steam reforming such as via reaction (1) supra. Reaction tubes 17 are exposed to radiant heating in the furnace, and are at a highly elevated temperature. Tubes 17 extend through the roof of the furnace to external supports, not shown.

The mixing of the superheated steam and the gaseous hydrocarbon is preferably attained by usage of a novel apparatus combination, which accomplishes mixing of the streams without cracking or premature decomposition of the hydrocarbon, thus avoiding carbon deposition. Referring to the top of the furnace, gaseous hydrocarbon stream 19 consisting of a normally gaseous hydrocarbon such as methane or a prevaporized normally liquid hydrocarbon such as petroleum naphtha is passed into flanged distribution conduit 20. Stream 19 is thus distributed into vertical conduits 21, which extend downwards into the tubes 17. Conduits 21 are preferably insulated within the tubes 17, by thermal insulation layer 22, so as to prevent premature overheating of the gaseous hydrocarbon and concomitant cracking. The conduits 21 discharge the gaseous hydrocarbon into the throat section of baffles 23, which are preferably funnel-shaped with downwardly converging walls. The superheated steam is discharged from horizontal connections 16 into the annular section of baffles 23 external to conduit 21, and is instantly and completely mixed with the gaseous hydrocarbon in the throat section of baffles 23 and in the ducts 24 which depend downwards from the lower ends of baffles 23. The process mixture is then discharged from ducts 24 into the catalyst beds 18 within tubes 17.

The gaseous mixture passes downwards through catalyst beds 18 and steam reforming of the gaseous hydrocarbon takes place, with the production of a synthesis gas principally containing hydrogen. The synthesis gas stream passes through catalyst retention grids 25 in the lower ends of tubes 17, and is discharged from tubes 17 into vertical outlet conduits 26 which extend downwards from tubes 17 through perforations in partition 4. Conduits 26 in turn discharge the reformed gas stream into horizontal collection conduit 27 disposed in the lower preheat chamber, and the reformed gas stream is finally passed via the flanged outlet of conduit 27 to process utilization as stream 28.

Figure 2:
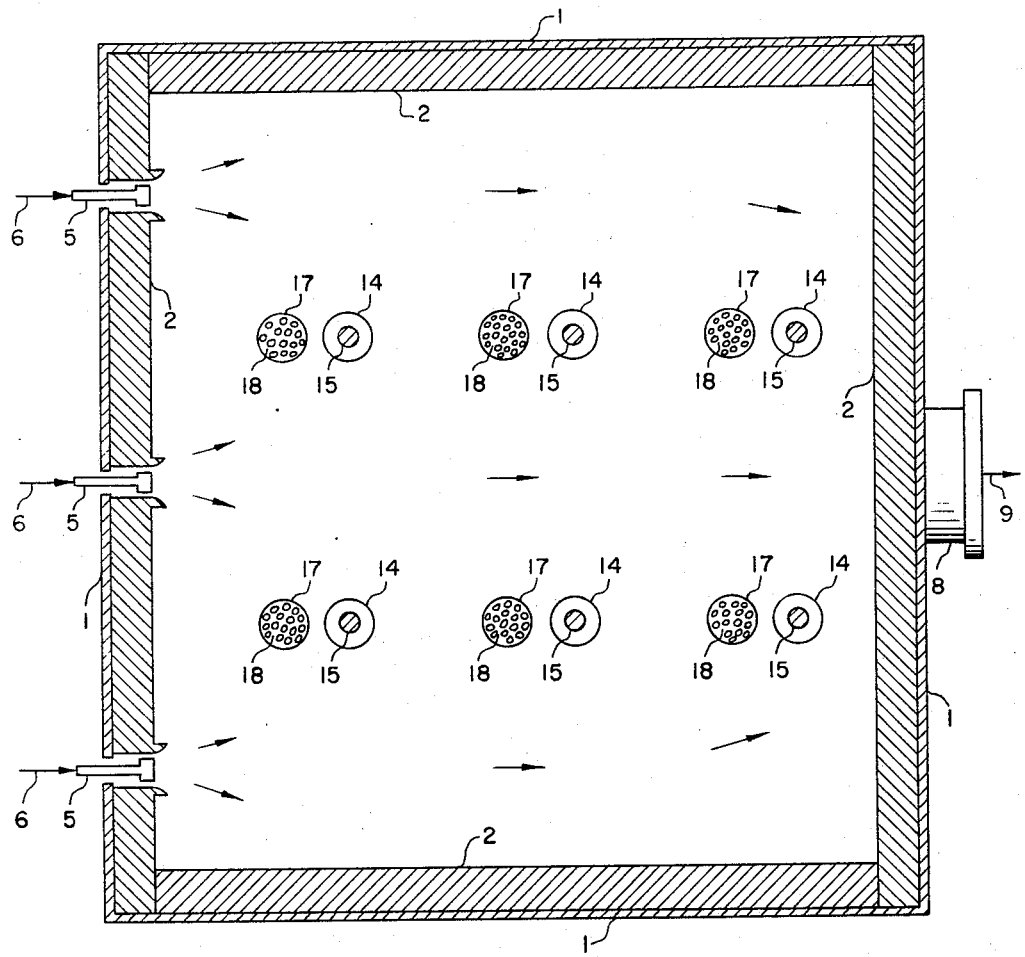
FIGURE 2 is a sectional plan view of FIGURE 1, taken on section 2—2.

FIGURE 2 is a sectional plan view of the furnace, taken on section 2—2 of FIGURE 1. The arrangement of reformer tube assemblies consisting of preheat tubes 14 and reaction tubes 17 is readily evident from FIGURE 2. The reformer tube assemblies are preferably arranged in linear rows, with the burners 5 being disposed in the wall 2 of the furnace between rows of reformer tube assemblies, so as to discharge combustion flame adjacent to the tubes without directly impinging on any tubes. This preferable arrangement of the burner relative to the tube assemblies serves to provide uniform heating of the tubes without the development of excessive temperature gradients or the overheating of any single tube.

Figure 3:
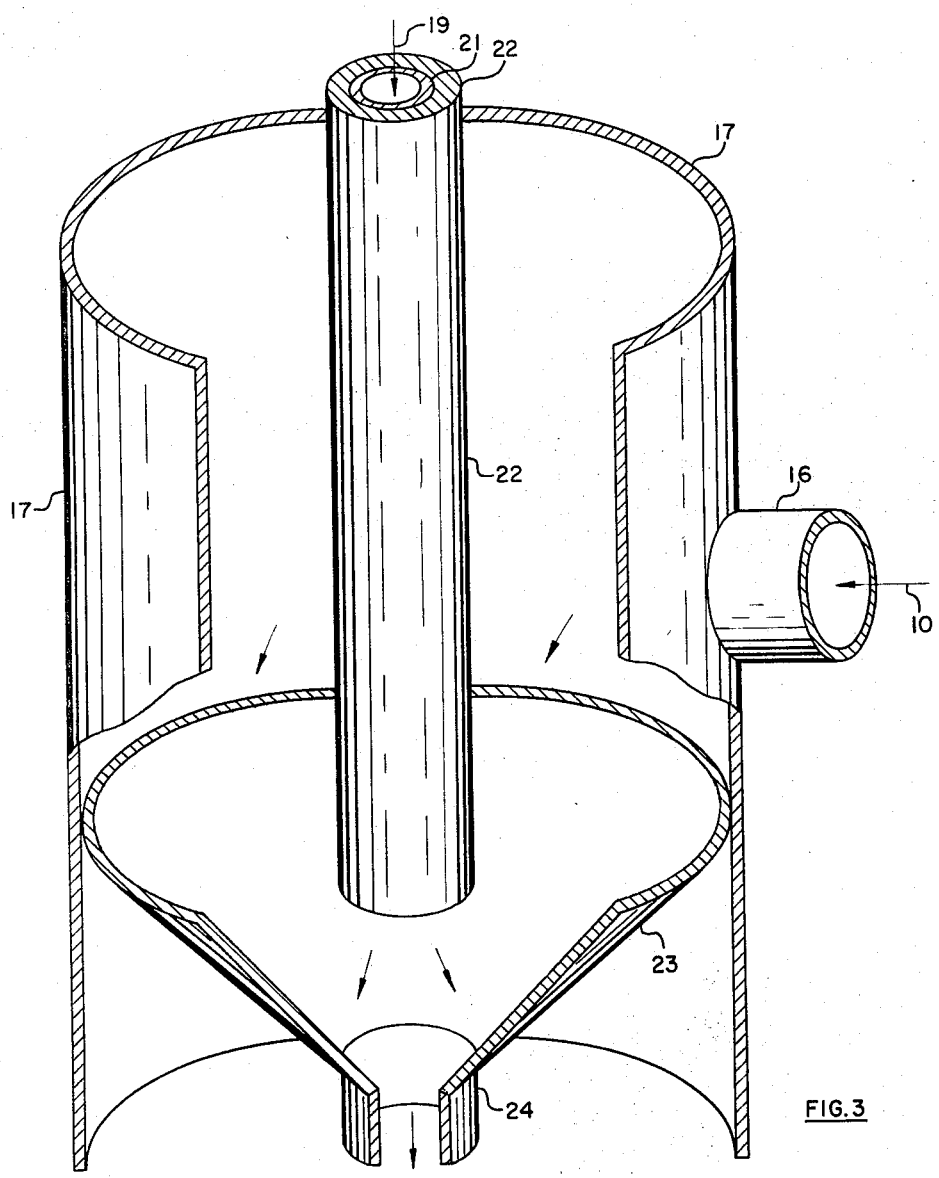
FIGURE 3 is an isometric view of the preferable apparatus arrangement for improved mixing of the gaseous hydrocarbon with the superheated steam.

FIGURE 3 is an isometric view of the preferable apparatus combination for mixing of the gaseous hydrocarbon with the superheated steam, showing the co-acting combination of the vertical conduit 21 for inlet of the hydrocarbon which extends downwards into the throat section of the funnel-shaped baffle 23. The lateral inlet of the superheated steam via connector 16, which discharges into the annular space between conduit 21 and baffle 23 is also evident. The gaseous components are thus rapidly mixed in the throat section of the baffle 23, from which the mixing and dispersal duct 24 depends downward to the catalyst bed, not shown.

Numerous alternatives within the scope of the present invention will occur to those skilled in the art. Thus, the input stream 10 consisting of process steam may also contain other process components such as oxygen or an oxygen-containing gas in suitable instances. In this respect, stream 10 could consist of a mixture of steam and air, so that the final reformed gas mixture 28 would contain a proportion of nitrogen. This alternative would be desirable in cases where stream 28 is to be utilized as ammonia synthesis gas, after further conventional processing including catalytic reaction of the carbon monoxide component with steam to produce further hydrogen and removal of carbon dioxide. A final gas stream containing hydrogen and nitrogen in the requisite 3:1 molar ratio is thus produced.

Stream 10 could also consist of a mixture of steam and carbon dioxide, with the latter component being present to provide a higher proportion of carbon monoxide in the final synthesis gas stream 28, as well as a residual proportion of carbon dioxide. In this case, stream 28 would be suitable as a synthesis gas for the catalytic production of synthetic methanol.

The apparatus combination of insulated vertical conduit 21 for inlet of gaseous hydrocarbon into the throat of funnel-shaped baffle 23 and annular inlet of superheated steam via horizontal connector 16 into the annular space between conduit 21 and baffle 23, with subsequent instantaneous mixing of the gaseous hydrocarbon with the superheated steam in the throat section of baffle 23 and in the dependent duct 24, constitutes a novel and preferred apparatus combination within the scope of the present invention. However, in suitable instances duct 24 and its concomitant function may be omitted, with satisfactory mixing being attained by the convergence of the process streams at the throat of baffle 23. Other suitable apparatus for the rapid mixing the process streams, besides the vertical conduit 21 and funnel-shaped baffle 23, will occur to those skilled in the art.

The axial inner cores 15 which are centrally disposed within preheat tubes 14 have been shown as solid cores. It will be evident that cores 15 may in practice alternatively consist of hollow cylindrical pipes, suitably mounted coaxially within tubes 14 and closed at both ends.

Finally, the container 1 has been shown as a vertically extending rectangular container, as particularly illustrated in FIGURE 2. It will be evident that other suitable furnace configurations may be adopted in practice. Thus, the furnace container 1 may alternatively consist generally of vertically extending cylindrical container. In this case, the reformer tube assemblies would be disposed in linear rows extending radially from the central axis of the container. The burners 5 would then be disposed in the container wall in vertical rows in the sectors between adjacent radial rows of linear reformer tube assemblies.

Other obvious alternatives and modifications within the scope of the present invention will occur to those skilled in the art. Thus, in its broadest embodiment, the lower furnace preheat chamber and the steam preheat coils 12 could be omitted. In this case, the steam feed stream 10 would be directly passed into the preheat tubes 14 and the lower refractory partition 4 would not be perforated. Instead, the flue gas stream 9 would be directly removed from the main radiant heating chamber of the furnace.

We claim:

1. A hydrocarbon reformer furnace comprising a vertically extending container, a plurality of reformer tube assemblies vertically suspended in a radiant undivided heat section within said container, each of said reformer tube assemblies comprising a catalyst-filled reaction tube and an adjacent preheat tube parallel to said reaction tube within said radiant heat section, each of said preheat tubes being connected to the adjacent reaction tube at their respective upper ends, means to pass steam into the lower ends of each of said preheat tubes whereby said steam flows upward in said preheat tubes and is super-heated by radiant heat, means to pass a gaseous hydrocarbon into the upper end of each of said reaction tubes, whereby said hydrocarbon mixes with said superheated steam and the mixtures flows downward through said reaction tubes in contact with said catalyst, means to remove reformed gas mixture from the lower ends of said reaction tubes, and heating means within said container to direct combustion flame heat horizontally across the vertically extending reformer tubes and adjacent steam preheat tubes to heat said reformer tube assemblies by radiant heating and thereby maintain a highly elevated temperature, whereby catalytic steam reforming of said gaseous hydrocarbon takes place within said reaction tubes.

2. A hydrocarbon reformer furnace comprising a vertically extending refractory-lined container, a plurality of reformer tube assemblies vertically suspended in a radiant undivided heat section within said container, each of said reformer tube assemblies comprising a catalyst-filled reaction tube and an adjacent preheat tube parallel to said reaction tube within said radiant heat section, each of said preheat tubes being connected to the adjacent reaction tube at their respective upper ends, a perforated horizontal refractory partition within said container and below said reformer tube assemblies, a plurality of hydrocarbon combustion burners positioned within said container above said partition to direct combustion flame heat horizontally across the vertically extending reformer tubes and adjacent steam preheat tubes, means for conducting fluid hydrocarbon fuel and air to said burners, whereby combustion of said fuel takes place within said container to provide radiant heat and the resulting flue gas passes downward through said partition, means to remove flue gas from said container below said partition, a plurality of preheat coils within said container and below said partition, said coils being in heat exchange with said flue gas and terminating with vertical extensions which extend upwards through said partition and connect with the lower ends of said preheat tubes, means to pass steam through said preheat coils whereby said steam flows upwards and into said preheat tubes and is superheated in said coils and said preheat tubes, said steam being highly superheated in said preheat tubes by radiant heat, means to pass a gaseous hydrocarbon into the upper end of each of said reaction tubes, whereby said hydrocarbon mixes with said superheated steam and the mixture flows downward through said reaction tubes, and means to remove reformed gas mixture from the lower ends of said reaction tubes.

3. A hydrocarbon reformer furnace comprising a vertically extending container, a plurality of reformer tube assemblies vertically suspended in a radiant undivided heat section within said container, each of said reformer tube assemblies comprising a catalyst-filled reaction tube and an adjacent preheat tube parallel to said reaction tube within said radiant heat section, each of said preheat tubes being connected to the adjacent reaction tube at their respective upper ends, means to pass steam into the lower ends of each of said preheat tubes whereby said steam flows upward in said preheat tubes and is superheated by radiant heat, a vertical funnel-shaped baffle having a terminal duct portion in the upper end of each of said reaction tubes, said baffle comprising downwardly converging side walls terminating at a throat opening in said duct, a thermally insulated conduit extending downward into the upper end of each of said reaction tubes, said insulated conduits terminating at the throat sections of said baffles, means to pass a gaseous hydrocarbon into said conduits, whereby said gaseous hydrocarbon mixes with superheated steam in the throat sections of said baffles and the mixture flows downward through said ducts and thence through said reaction tubes in contact with said catalyst, means to remove reformed gas mixture from the lower ends of said reaction tubes, and heating means within said container to direct combustion flame heat horizontally across the vertically extending reformer tubes and adjacent steam preheat tubes to heat said reformer tube assemblies by radiant heating and thereby maintain a highly elevated temperature, whereby catalytic steam reforming of said gaseous hydrocarbon takes place within said reaction tubes.

4. A hydrocarbon reformer furnace comprising a vertically extending refractory-lined container, a plurality of reformer tube assemblies vertically suspended in a radiant undivided heat section within said container, each of said reformer tube assemblies comprising a catalyst-filled reaction tube and an adjacent preheat tube parallel to said reaction tube within said radiant heat section, each of said preheat tubes being connected to the adjacent reaction tube at their respective upper ends, a perforated horizontal refractory partition within said container and below said reformer tube assemblies, a plurality of hydrocarbon combustion burners positioned within said container above said partition to direct combustion flame heat horizontally across the vertically extending reformer tubes and adjacent steam preheat tubes, means for conducting fluid hydrocarbon fuel and air to said burners, whereby combustion of said fuel takes place within said container to provide radiant heat and the resulting flue gas passes downward through said partition, means to remove flue gas from said container below said partition, a plurality of preheat coils within said container and below said partition, said coils being in heat exchange with said flue gas and terminating with vertical extensions which extend upwards through said partition and connect with the lower ends of said preheat tubes, means to pass steam through said preheat coils whereby said steam flows upwards and into said preheat tubes and is superheated in said coils and said preheat tubes, said steam being highly superheated in said preheat tubes by radiant heat, a vertical funnel-shaped baffle having a terminal duct portion in the upper end of each of said reaction tubes, said baffle comprising downwardly converging side walls terminating at a throat opening in said duct, a thermally insulated conduit extending downward into the upper end of each of said reaction tubes, said insulated conduits terminating at the throat sections of said baffles, means to pass a gaseous hydrocarbon into said conduits, whereby said gaseous hydrocarbon mixes with superheated steam in the throat sections of said baffles and the mixture flows downward through said ducts and thence through said reaction tubes in contact with said catalyst, and means to remove reformed gas mixture from the lower ends of said reaction tubes.

5. A hydrocarbon reformer furnace comprising a vertically extending refractory-lined container, a plurality of reformer tube assemblies vertically suspended in a radiant undivided heat section within said container, each of said reformer tube assemblies comprising a catalyst-filled reaction tube and an adjacent preheat tube parallel to said reaction tube within said radiant heat section, each of said preheat tubes being connected to the adjacent reaction tube at their respective upper ends, a perforated horizontal refractory partition within said container and below said reformer tube assemblies, a plurality of hydrocarbon combustion burners positioned within said container above said partition to direct combustion flame heat horizontally across the vertically extending reformer tubes and adjacent steam preheat tubes, means for conducting fluid hydrocarbon fuel and air to said burners, whereby combustion of said fuel takes place within said container to provide radiant heat and the resulting flue gas passes downward through said partition, means to remove flue gas from said container below said partition, a plurality of preheat coils within said container and below said partition, said coils being in heat exchange with said flue gas and terminating with vertical extensions which extend upwards through said partition and connect with the lower ends of said preheat tubes, a solid axial core centrally disposed within each of said preheat tubes, means to pass steam through said preheat coils whereby said steam flows upward from said coils into the annular space between said cores and said preheat tubes and is superheated in said coils and said preheat tubes, said steam being highly superheated in said preheat tubes by radiant heat, means to pass a gaseous hydrocarbon into the upper end of each of said reaction tubes, whereby said hydrocarbon mixes with said superheated steam and the mixture flows downward through said reaction tubes, and means to remove reformed gas mixture from the lower ends of said reaction tubes.

6. A hydrocarbon reformer furnace comprising a vertically extending refractory-lined container, a plurality of reformer tube assemblies vertically suspended in a radiant undivided heat section within said container, each of said reformer tube assemblies comprising a catalyst-filled reaction tube and an adjacent preheat tube parallel to said reaction tube within said radiant heat section, each of said preheat tubes being connected to the adjacent reaction tube at their respective upper ends, a perforated horizontal refractory partition within said container and below said reformer tube assemblies, a plurality of hydrocarbon combustion burners positioned within said container above said partition to direct combustion flame heat horizontally across the vertically extending reformer tubes and adjacent steam preheat tubes, means for conducting fluid hydrocarbon fuel and air to said burners, whereby combustion of said fuel takes place within said container to provide radiant heat and the resulting flue gas passes downward through said partition, means to remove flue gas from said container below said partition, a plurality of preheat coils within said container and below said partition, said coils being in heat exchange with said flue gas and terminating with vertical extensions which extend upwards through said partition and connect with the lower ends of said preheat tubes, a solid axial core centrally disposed within each of said preheat tubes, means to pass steam through said preheat coils whereby said steam flows upward from said coils into the annular space between said cores and said preheat tubes and is superheated in said coils and said preheat tubes, said steam being highly superheated in said preheat tubes by radiant heat, a vertical funnel-shaped baffle having a terminal duct portion in the upper end of each of said reaction tubes, said baffle comprising downwardly converging side walls terminating at a throat opening in said duct, a thermally insulated conduit extending downward into the upper end of each of said reaction tubes, said insulated conduits terminating at the throat sections of said baffles, means to pass a gaseous hydrocarbon into said conduits, whereby said gaseous hydrocarbon mixes with superheated steam in the throat sections of said baffles and the mixture flows downward through said ducts and thence through said reaction tubes in contact with said catalyst, and means to remove reformed gas mixture from the lower ends of said reaction tubes.

7. A hydrocarbon reformer furnace comprising a vertically extending container, a plurality of catalyst-filled reaction tubes vertically suspended in a radiant undivided heat section within said container, means to pass superheated steam into the upper end of each of said reaction tubes, a vertical funnel-shaped baffle having a terminal duct portion in the upper end of each of said reaction tubes, said baffle comprising downwardly converging side walls terminating at a throat opening in said duct, a thermally insulated conduit extending downward into the upper end of each of said reaction tubes, said insulated conduits terminating at the throat sections of said baffles, means to pass a gaseous hydrocarbon into said conduits, whereby said gaseous hydrocarbon mixes with superheated steam in the throat sections of said baffles and the mixture flows downward through said ducts and thence through said reaction tubes in contact with said catalyst, heating means within said container to direct combustion flame heat horizontally across the vertically extending reaction tubes to heat said reaction tubes by radiant heating and thereby maintain a highly elevated temperature, whereby catalytic steam reforming of said gaseous hydrocarbon takes place within said reaction tubes, and means to remove reformed gas mixture from the lower ends of said reaction tubes.

References Cited

UNITED STATES PATENTS

| | | | |
|---|---|---|---|
| 2,029,317 | 2/1936 | Guyer et al. | 48—94 |
| 2,029,604 | 2/1936 | Bayer et al. | |
| 2,518,583 | 8/1950 | Watson | 23—288.92 |
| 2,518,850 | 8/1950 | Watson | 23—288 |
| 2,524,840 | 10/1950 | Shapleigh | 48—214 X |
| 2,645,567 | 7/1953 | Thomas et al. | 23—288.92 |
| 2,801,159 | 7/1957 | Carton et al. | 28—214 |
| 2,894,826 | 7/1959 | Stengel | 23—288 |
| 3,119,671 | 1/1964 | Koniwiez et al. | 23—277 |
| 3,156,544 | 11/1964 | Eck et al. | 48—214 X |
| 3,257,172 | 6/1966 | Kao et al. | 49—94 X |

FOREIGN PATENTS

| | | |
|---|---|---|
| 690,403 | 4/1964 | Canada. |
| 1,145,586 | 3/1963 | Germany. |

NORMAN YUDKOFF, *Primary Examiner.*

F. E. DRUMMOND, *Assistant Examiner.*